Figure 1:
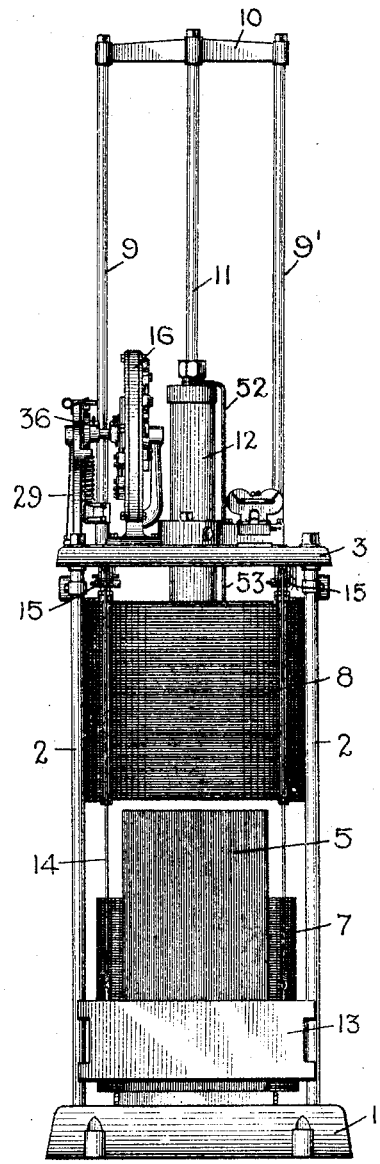

No. 783,513. PATENTED FEB. 28, 1905.
R. FLEMING.
REGULATOR.
APPLICATION FILED SEPT. 26, 1903.

6 SHEETS—SHEET 1.

Witnesses:
Inventor
Richard Fleming.
By Atty.

No. 783,513.  
PATENTED FEB. 28, 1905.  
R. FLEMING.  
REGULATOR.  
APPLICATION FILED SEPT. 26, 1903.
6 SHEETS—SHEET 2.
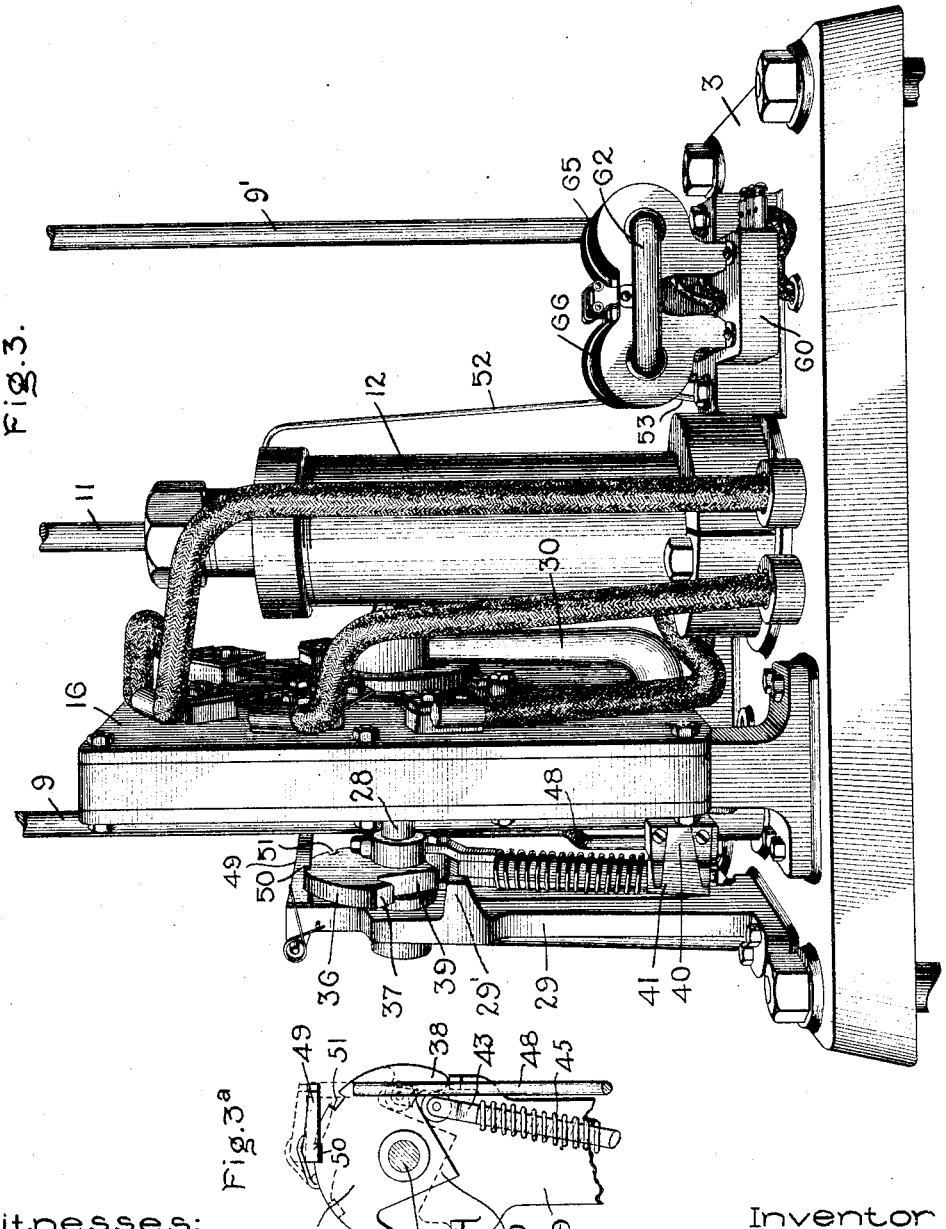
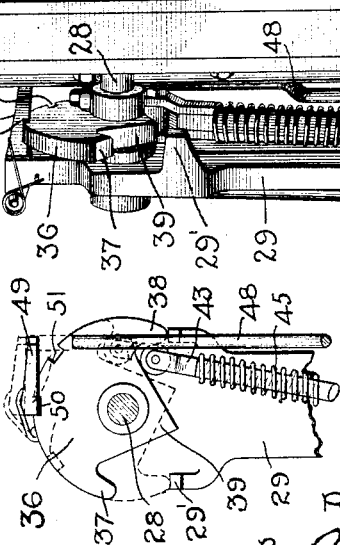
Witnesses:  
Inventor  
Richard Fleming.  
Att'y.

No. 783,513. PATENTED FEB. 28, 1905.
R. FLEMING.
REGULATOR.
APPLICATION FILED SEPT. 26, 1903.
6 SHEETS—SHEET 3.
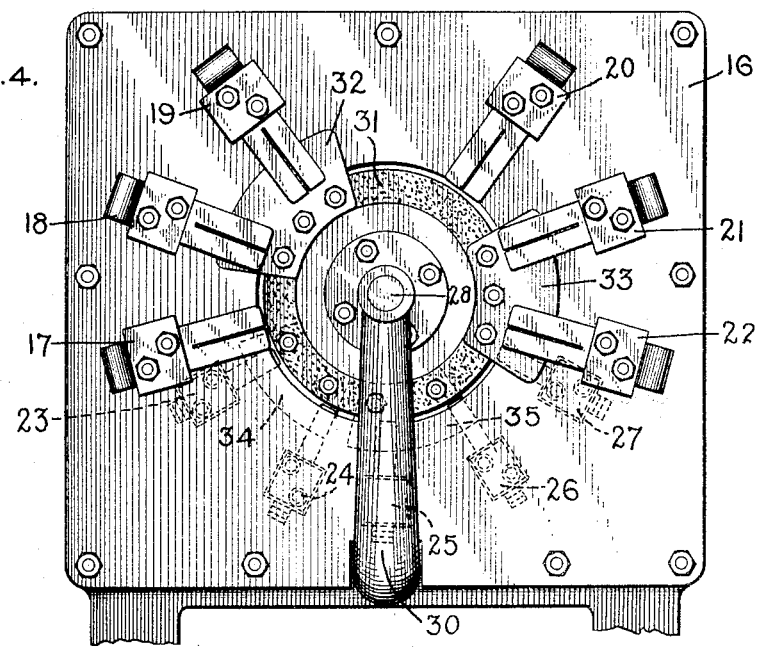
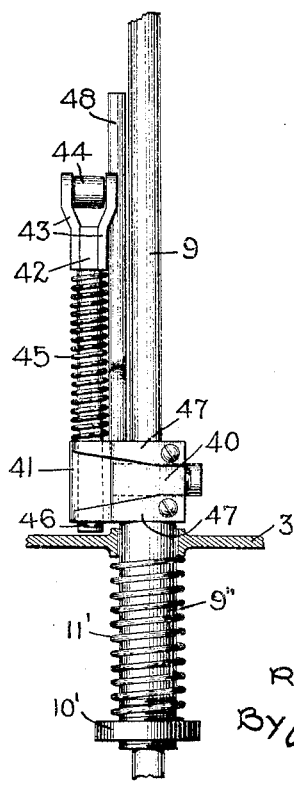
Witnesses:
Inventor
Richard Fleming

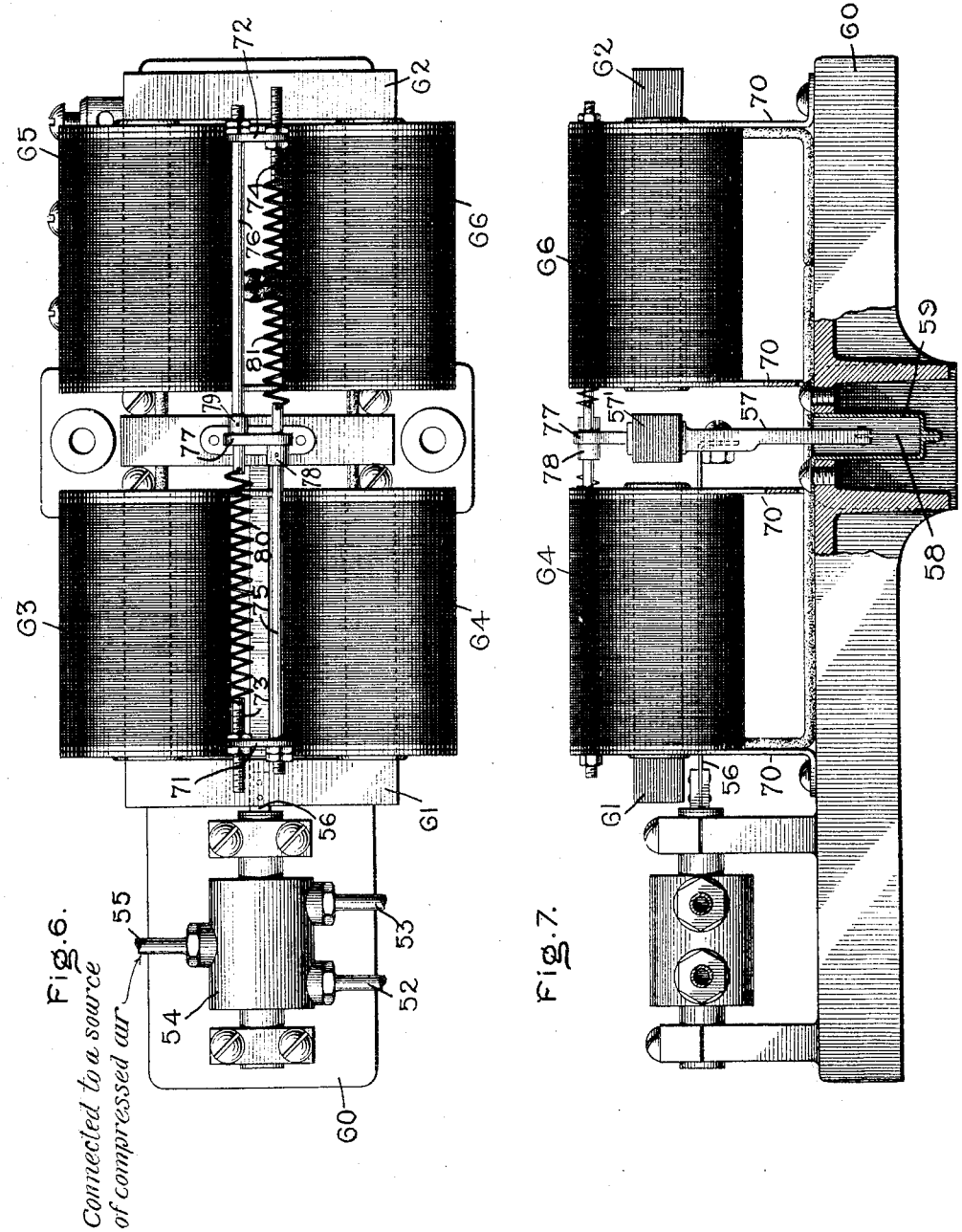

No. 783,513. PATENTED FEB. 28, 1905.
R. FLEMING.
REGULATOR.
APPLICATION FILED SEPT. 26, 1903.

6 SHEETS—SHEET 5.

Witnesses:
Erving R Gurney.
Helen Oxford

Inventor
Richard Fleming.
By Albert G. Davis
Att'y.

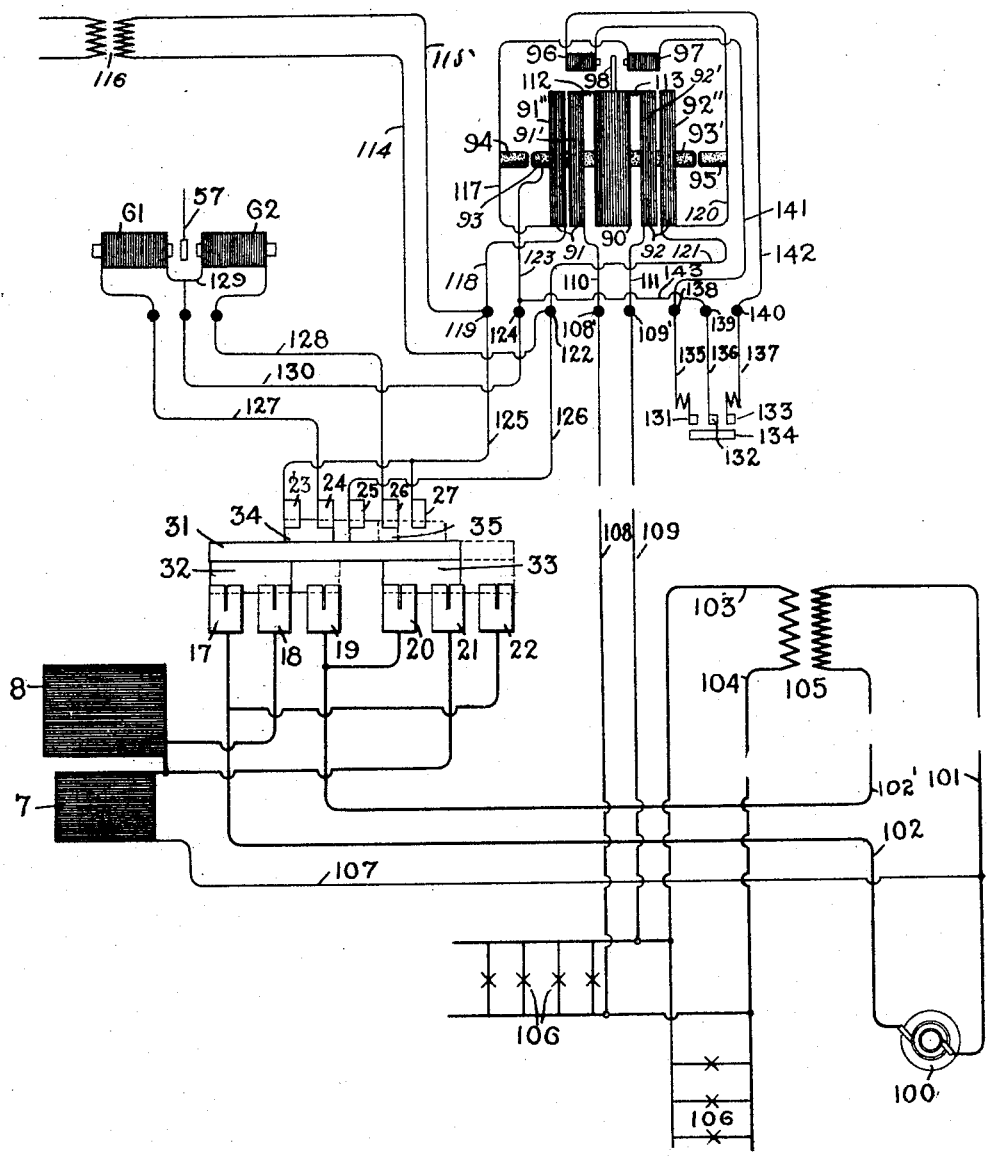

No. 783,513.   Patented February 28, 1905.

UNITED STATES PATENT OFFICE.

RICHARD FLEMING, OF LYNN, MASSACHUSETTS, ASSIGNOR TO GENERAL ELECTRIC COMPANY, A CORPORATION OF NEW YORK.

REGULATOR.

SPECIFICATION forming part of Letters Patent No. 783,513, dated February 28, 1905.

Application filed September 26, 1903. Serial No. 174,695.

*To all whom it may concern:*

Be it known that I, RICHARD FLEMING, a citizen of the United States, residing at Lynn, county of Essex, State of Massachusetts, have invented certain new and useful Improvements in Regulators, of which the following is a specification.

The object of my present invention is to improve the construction and operation of means for regulating the electrical condition of electric systems.

The particular embodiment of my invention which I have hereinafter described and illustrated somewhat in detail is intended to regulate the voltage between lines supplying alternating current. In this form of my invention I have employed a voltmeter or the like responsive to changes in the voltage of the system to be regulated to control the operation of a valve or valves of a fluid-pressure system. The fluid-pressure system includes a member which is moved to different positions as the valve or valves controlled by the voltmeter or the like are operated. The means by which the voltage between the supply-lines is actually altered comprises a pair of coils in inductive relation with each other, one of the coils being in series with the circuit including the supply-lines and the other in shunt thereto, and means for varying the inductive relation between these two coils. In the particular form of my invention which I have illustrated and described one of these coils is fixed and the other of the coils is movable, being moved into and out of a position of best inductive relation to the stationary coil by the movable member of the fluid-pressure system above mentioned. In order to increase the effective range of the apparatus, I have devised means for reversing the connections of one of the coils when the mutual induction between the two coils is at a minimum, so that the voltage change produced by the coils is reversed in direction, thus doubling the capacity of the apparatus.

My invention also comprises many novel features of construction and arrangement, all of which will be pointed out with particularity in the claims appended to and forming a part of this specification.

For a better understanding of my invention reference may be had to the accompanying drawings and diagram, in which I have illustrated one form of my invention.

Figure 2:
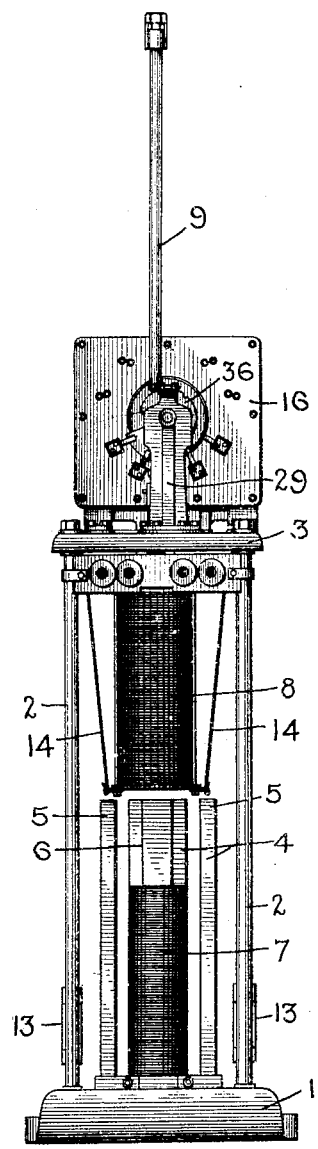
Figure 8:
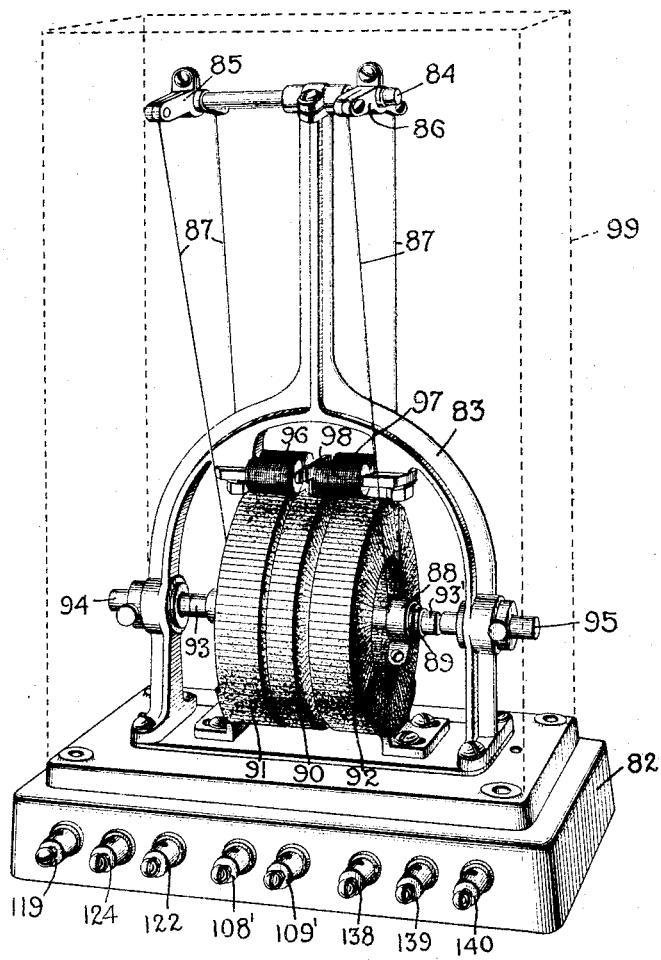

Of the drawings, Figure 1 is a side elevation, and Fig. 2 an end elevation, illustrating the voltage-changing means proper and part of the controlling means therefor. Figs. 3 and 3ª are enlarged perspective views showing details of the construction shown in Figs. 1 and 2. Fig. 4 is an elevation taken similarly to Fig. 2, showing the construction of the reversing-switch. Fig. 5 is a view taken similarly to Fig. 1, showing details of the mechanism for actuating the reversing-switch. Figs. 6 and 7 are enlarged views showing details of construction of the valve-operating relays. Fig. 8 is a perspective view showing the construction of the balance or voltmeter employed, and Fig. 9 is a diagram showing the arrangement of circuits of the regulator as a whole.

Referring particularly to Figs. 1 and 2, 1 is a base from which four vertical posts 2 extend. These posts carry at their upper ends a platform or support 3. The base 1 carries an E-shaped core of magnetic material 4, having upwardly-extending side legs 5 and a middle leg 6. Upon the middle leg 6 of this core is placed the stationary coil 7. The movable coil 8 of the regulator is supported by a pair of rods 9 9', which pass through apertures formed for the purpose in a platform 3 and which are secured at their upper ends to a cross-head 10, to which is also connected a piston-rod 11, located midway between the rods 9 9'. The piston-rod 11 is secured to a piston which is mounted within a vertical cylinder 12, carried by the platform 3, and the movable coil 8 is moved into different positions as the piston in the cylinder 12 is moved from one position to another. Counterbalances 13, placed one on each side of the E-shaped core and arranged to be guided by opposite pairs of rods 2, are connected to the movable coil through flexible cords or members 14, running over pulleys 15, secured to the under side of the platform 3. One or both of the rods 9 9' may be provided with a rigidly-attached sleeve 9", carrying a collar or nut 10' and a spring 11', which is held between the collar and the platform 3. The spring acts as a buffer to prevent a jar when the movable coil moves to its upward limit.

As the piston in the cylinder 12 is moved into different positions the coil 8 is moved from the position shown in Fig. 1, which marks the upward limit of its movement, into the position in which it surrounds the coil 7, the space between the outer side of the coil 7 and the inner sides of the end legs 5 being sufficient to receive the tubular coil 8. The coefficient of mutual induction between the coils will vary from a minimum when in the position shown in Fig. 8 to a maximum when the coil 8 surrounds the coil 7.

A vertical switchboard 16 is mounted on the upper side of the platform 3. The switchboard 16 carries on its right-hand side as viewed in Fig. 1 six fixed contact members 17, 18, 19, 20, 21, and 22. These are arranged in two sets of three each, as shown in full lines in Fig. 4. The opposite side of the switchboard carries five contacts 23, 24, 25, 26, and 27. (Shown in dotted lines in Fig. 4.) A shaft 28, mounted in brackets 29 and 30, passes perpendicularly through the switchboard and carries a disk or the like of insulating material 31, on one side of which are mounted a pair of switch or contact members 32 and 33, formed of conducting material adapted to connect the fixed contacts 17 18 19 and 20 21 22, respectively. These movable contact members 32 and 33 are so proportioned that normally they will connect the middle fixed contact members 18 and 21 of each set with one or the other of the outside members, as shown in Fig. 4; but when in the intermediate position each will bridge all three contacts of one set. On the opposite side of the disk 31 are mounted a pair of contact members 34 and 35, arranged to connect the contacts 23 24 and 25 26, respectively, or 24 25 and 26 27, respectively, according to the position in which the shaft 28 is placed.

The shaft 28 has secured to it near its outer end a cam 36. (See Figs. 1, 2, and 3.) This cam has formed on its periphery a couple of shoulders 37 and 38, (see Figs. 3 and 3ª,) separated from each other by a V-shaped portion 39. Stops 29' are carried by the bracket 29, which coöperate with the outer edges of the shoulders 37 and 38 to limit the movements of the cam, and thereby the shaft 28. Notches 50 and 51 are formed in the upper periphery of the cam, into one or the other of which a spring-pressed latch 49, also mounted on the bracket 29, may enter to hold the cam in the position shown in full lines or dotted lines, respectively, in Fig. 3. The free end of the latch 49 is offset to the right for a purpose to be hereinafter described. The notches 50 and 51 and latch 49 are so arranged that when the cam is in either of the two operative positions shown in Fig. 3 the V-shaped portion 39 does not point downward, but to one side or the other of the vertical line passing through the axis of the shaft 28.

The left-hand rod 9, as seen in Fig. 1, has fixed to it a block 40, which is placed just above or may be integral with the sleeve 9'. A block 41 is pivoted to the block 40. The block 41 is provided with an aperture, in which a rod 42 has a sliding fit. The rod 42 is provided at its upper end with a pair of arms or brackets 43, in which a roller 44 is mounted. The rod 42 is normally held in the position with respect to the blocks 41 and 40 shown in Fig. 5 by means of a compression-spring 45, which surrounds the rod 42 and abuts against the upper surface of the block 41 and the under surface of the members 43. A cotter-pin 46 or the like, carried by the lower end of the rod 42, limits the upward movement of the rod 42 with respect to the block 41. A pair of spring members 47, secured to one side of the block 40, bear against the block 41 and tend to hold the rod 42 in a position parallel to the rod 9. The block 40 also carries a rod 48. The upper end of this rod is offset, as shown in Fig. 3, so as to clear the shaft 28, and is adapted to engage the offset free end of the latch 49, pivoted at the upper end of the bracket 29, and lift it out of the notch, 50 or 51, in which it may be resting when the block 40 and rod 48 approach the upper limit of their movement.

When the rod 9 is moved upward by the piston-rod 11, the roller 44 will engage one or the other of the shoulders 37 and 38, according to the position in which the projection 39 is held. At this point the upward movement of the rod 42 is arrested for the time being, and further movement of the rod 9 and block 40 serves to compress the spring 45 until the upper end of the rod 48 engages the outer end of the latch 49 and lifts it out of the particular one of the notches formed in the upper face of the periphery of the cam in which it may happen to be located at that instant. When the latch 49 is lifted out of the notch, the shaft 28 will be quickly rotated by engagement between the roller and the shoulder under the action of the compressed spring 45. The rotation of the shaft in this direction will be limited by the engagement of the outer surface of one of the shoulders 37 with the corresponding stop 29' at the point at which the latch 49 is in position to engage with the other of the two upper notches 50 and 51 when released by the downward movement of the rod 48.

The rotation of the shaft 28 shifts the movable contact members 32 and 33 and 34 and 35 for a purpose to be hereinafter explained. The rotation of the shaft 28 causes the projecting portion 39 to be moved to the opposite side of the vertical line passing through the shaft, and when the rod 9 moves downward so that the roller 44 clears the end of the projection the spring 47 will act to throw the rod 42 back into the vertical position from which it has been displaced by its engagement with the inclined face of the projection 39. When the rod 9 moves upward again, the roller 44 will strike the opposite side of the V-shaped projection from that in the first-described action and will operate to throw the cam and the switch members back into their original position.

Pipes 52 and 53 lead from opposite ends of the cylinder 12 to the valve-chamber 54. (See Figs. 6 and 7.) A pipe 55 connects the valve-chamber with some source of fluid under pressure. Preferably this fluid is compressed air. The valve within the chamber 54 is reciprocated by a connecting-rod or actuating member 56, which has its outer end secured to one end of a vibrating armature 57. The details of the valve mechanism for the cylinder have not been illustrated, as the particular construction of this mechanism forms no part of my present invention. The armature 57 is mounted upon a flexible support 58, which is secured in a well or recess 59 in a support or base 60 upon which the valve-chamber and operating mechanism is mounted. Preferably the base 60 is placed upon the upper side of a platform 3, as is clearly shown in Fig. 3. The armature comprises a part 57', which may be formed of a bundle of laminations of magnetic material and which is located between a pair of electromagnets 61 and 62. The U-shaped cores 61' and 62', respectively, of these magnets are placed with the ends of the legs opposing one another, as is clearly shown in Figs. 6 and 7. The legs of the cores 61' and 62' are surrounded with coils 63 64 and 65 66, respectively. These electromagnets are supported from the base 60 by legs 70, which may be formed of sheet-brass or other suitable material. Apertured plates 71 and 72 are carried at the outer end of each of these electromagnets. Screw-bolts 73 and 74 are adjustably mounted in the plates 71 and 72, respectively. Rods 75 and 76, having stop-nuts at their outer ends, are slidingly mounted in the plates 71 and 72, respectively. These rods also pass loosely through apertures formed in a plate 77, mounted on the upper side of the armature 57. The rods 75 and 76 are provided with collars 78 and 79, respectively, which abut against opposite sides of the plate 77. The ends of the rods 75 and 76 project through the plate 77 and are connected to the adjustably-mounted screw-bolts 74 and 73, respectively, by springs 80 and 81. The springs and rods form a means for normally holding the armature in the position shown in Figs. 6 and 7, but allow the armature to be moved nearer to one or the other of the electromagnets against the tension of one or the other of the springs. It will readily be seen that when the armature is moved out of its middle position toward one or the other of the electromagnets the valve-operating member 56 will be moved in one direction or another, thus admitting air to one end or the other at the cylinder 12 to reciprocate the piston-rod 11 and mechanism carried thereby in one direction or the other.

The voltmeter or potential balance shown in Fig. 8 comprises a base or support 82, on which a bracket or frame 83 is mounted. The upper end of this yoke or frame has adjustably mounted in it a horizontal rod 84. Near each end of this rod are adjustably mounted cross-arms 85 and 86, respectively. A flexible cord or wire 87 depends from each end of each cross-arm. The lower ends of the cords or wires extending from each cross-arm are secured to collars 88 upon a horizontal shaft 89. The shaft 89 carries in any suitable manner a coil 90, which is located between a pair of coils 91 and 92, adjustably mounted on the upper side of the base 82. The shaft 89 also carries at its ends contact members 93 and 93', which may be formed out of carbon or other suitable material. The contact members 93 and 93' are electrically connected to each other by the shaft 89 or in any other suitable manner and are adapted to engage suitable contact members 94 and 95, respectively, which may also be formed out of carbon or the like and are mounted in the frame 83 in line with the shaft 89.

The rod 86 and cross-arms carried thereby are arranged, as shown in Fig. 8, in such manner that the shaft 89 and the movable coil are normally held by gravity in the position shown, with the contacts 93 and 94 in engagement with each other. The coils 90, 91, and 92 are so arranged that electric current will pass through their windings, which will under some circumstances by its magnetizing action cause the coil 90 to be moved to the right, as seen in Fig. 8, out of the position in which the contacts 93 and 94 are in engagement with each other. The current passing through the windings of the coils and the consequent movement of the movable coil 90 depend upon the condition of voltage between the lines to be regulated, as will be hereinafter fully explained. Under certain conditions the coil 90 will be moved to cause a separation of the contacts 93 and 94 without, however, necessarily being great enough to cause an engagement between the contacts 93' and 95. Under other conditions of voltage, however, the coil 90 will be moved to the right far enough to cause the contact 93' to engage the contact 95.

Electromagnets 96 and 97, carried by projections from the frame 83, are placed above the coils 91 and 92, respectively. The coil 90 carries on its upper surface an armature 98, which when attracted by one or the other of the coils 96 and 97 tends to hold the coil 90 in the position in which contact between the contact members 93 and 94 or 93' and 95, respectively, takes place. Binding-posts 119, 124, 122, 108', 109', 138, 139, and 140 are carried by the base 82. The voltmeter or balance mechanism may be inclosed in a suitable case 99 (shown in dotted lines in Fig. 8) and preferably is mounted independently of the mechanism hereinbefore described.

Referring to the diagram shown in Fig. 9, 100 represents a generator or other source supplying alternating current to lines 101 102. The line 102 is adapted to be connected in series with the line 102'. The voltage between the lines 101 and 102' is regulated to maintain a constant potential between the lines 103 and 104, which lead from one winding of a transformer 105, the other winding of which is in shunt across the lines 101 102. The lines 103 104 supply current to consuming devices, such as the arc-lamps 106. The line 102 leads from the generator to the contacts 17 and 22, while the line 102' leads to the contacts 19 and 20. The contacts 18 and 21 are connected to the terminals of the movable coil 8. One of the terminals of the coil 7 is connected to the contact 21, and the other terminal is connected to the line 101 through a line 107. When the movable switch member 28 is in the position shown in Fig. 9, the contacts 17 18 and 20 21, respectively, are in electrical connection, and the coil 8 is in circuit between the conductors 102 and 102', with the terminal of the coil extending to the contact 18 connected to the line of 102 and the terminal of the coil 8 extending to the contact 21 connected to the line 102'. When so arranged, the passage of current through the coil 7 will through the inductive relation existing between the coils 7 and 8 create a difference of potential between the terminals of the coil 8, which will tend to raise or lower the voltage existing between the lines 101 and 102', depending upon the connections and arrangements of the coils. The amount of voltage change produced by the coils depends upon their inductive relation and will be affected by the relative position of the coils. When the switch-carrying member 31 is moved to the position shown in dotted lines in Fig. 9, the contacts 18 and 19 are connected through the contact 32, and the contacts 21 and 22 are connected by the contact 33. This has the effect of reversing the connections of the coil 8 with respect to the lines 102 and 102', and this reversal of the connections of the coil 8 reverses the voltage change between the lines 101 and 102' produced by the induction between the coils 7 and 8. It will be noted that the contacts 32 and 33 are of such an extent that in passing from the position shown in full lines in Fig. 9 to that shown in dotted lines the terminals 17 18 19 and 20 21 22 are necessarily connected for an instant. This has the effect of short-circuiting the coil 8 at that particular instant and also avoids breaking the circuit connecting lines 102 and 102'. Lines 108 and 109 extend from the lines 103 and 104 to binding-posts 108' and 109'. These binding-posts are connected by leads 110 111 to one of the terminals of the winding 91' and 92', forming parts of the coils 91 and 92, respectively. Flexible leads 112 and 113 connect the other terminals of the windings 91' and 92', respectively, with the terminals of the coil 90. The circuit between binding-posts 108 and 109 is through the lead 110, the winding 91', lead 112, the winding of the coil 90, lead 113, the winding 92', and the lead 111. The windings of the various coils are arranged so that the passage of current through these coils tends to move the movable coil 90 to the right, as shown in Figs. 8 and 9, against the action of gravity. The terminals of one of the windings of a transformer 116 or other source of current are connected by lines 114 and 115 to the binding-posts 119 and 122, respectively. The other winding of the transformer may be connected in shunt across the lines 103 104 or may be supplied with current in any other suitable manner. In order to avoid confusion in the showing, the connections between the transformer and the lines 103 104 have not been shown in Fig. 9. Lines 117 and 118 connect binding-post 119 with the contact 94 through a winding 91'', forming part of coil 91. Similarly, lines 120 and 121 complete a circuit between the binding-post 122 and the contact 95 through a winding 92'', forming part of the coil 92. A conductor 123 connects the binding-post 124 and the movable shaft carrying the coil 90. The line 125 connects the binding-post 119 with the contacts 23 and 27. The line 126 connects the binding-post 122 with the contact 25. Lines 127 and 128 connect contacts 24 and 26 with the terminals of the electromagnets 61 and 62, so that the electromagnets 61 and 62 are in series between the lines 127 and 128, the other terminals of electromagnets being connected by a line 129. A line 130 connects the binding-post 124 and the line 129. When the switch-carrying member 31 is in the position shown in full lines in Fig. 9, the contacts 23 and 24 are connected, as are the contacts 25 and 26. When the switch-carrying member 28 is moved into the position shown in dotted lines in Fig. 9, the contact 24 is connected with the contact 25 and the contact 26 is connected with the contact 27. When the switch-carrying member 31 is in the position shown in full lines in Fig. 9, a circuit extends from the line 115 to the line 114 by way of the line 125, contacts 23, 34, and 24, line 127, windings of the electromagnet 61, line 129, windings 66 of the electromagnet 62, line 128, contacts 26, 35, and 25, and line 126.

Under certain conditions of the voltage between the lines 103 and 104 the coil 90 is urged to the right, as seen in Fig. 9, far enough to cause engagement to take place between the contacts 93' and 95. When this takes place, a circuit will be thrown in shunt about the windings of the electromagnet 62. This circuit consists of the line 130, line 123, contacts 93 and 93', contact 95, line 120, winding 92'', line 121. As the inductance of the winding 92' which forms substantially all of the impedance of this circuit is much less than the inductance of the windings of the electromagnet 62, this shunt practically short-circuits the windings of the electromagnet 62. The short-circuiting of the windings of the electromagnet 62 causes the armature 57, which while current passes through the windings of both of the electromagnets is maintained in a state of equilibrium midway between the coils 64 and 66, to be moved toward the electromagnet 61. This movement of the armature operates the valve of the fluid-pressure system to establish connection between the pipes 55 and 53 to admit compressed air or the like to the end of the cylinder 12, which will cause the piston-rod 11, and through it the movable coil 8, to be moved in the desired direction. This alters the inductive relation between the coils 7 and 8 in such manner as to tend to alter the voltage existing between the lines 101 and 102' in the manner desired.

The winding 92' is so arranged that the passage of current through it occurring when the contacts 93' and 95 engage gives an impulse or "kick" to the coil 90, which ordinarily causes it to move to the left, thus separating the contacts 93' and 95. This separation is succeeded by rapidly-repeated engagements and separations if the voltage conditions of the circuit are such as to require them. The quick separation after each engagement is a desirable feature, as it tends to prevent hunting of the apparatus.

It will readily be seen that a sufficient change of the voltage between the lines 103 and 104 will allow the movable coil 90 to move to the left under the action of gravity until an engagement takes place between the contacts 93 and 94. When an engagement takes place between the contacts 93 and 94, a shunt is thrown about the windings of the magnet 61. This shunt, which includes the line 130, line 123, contacts 93 and 94, line 117, winding 91'', and line 118, is similar to that previously described as being thrown about the windings of the magnet 62. The effect of this shunt is to practically short-circuit the windings of the electromagnet 61. The winding 91'' is so arranged that the passage of current through it occurring when it is thrown into shunt with the windings of the magnet 61 will give an impulse to the coil 90, which will ordinarily move to the right, as seen in Fig. 8, thus separating the contacts 93 and 94. The short-circuiting of the electromagnet 62 will allow compressed air to be introduced into the cylinder 12 to move the coil 8 in such manner as to change the voltage between the lines 101 and 102', and thereby the voltage between the lines 103 and 104, in the necessary manner.

When the voltage between the lines 103 and 104 varies so that the coil 8 is moved to its extreme upper position, the movement into this position causes a movement of the switch-carrying member 31 in the manner hereinbefore described, which moves it from the full-line position shown in Fig. 9 to the dotted position. This has the effect of reversing the connections of the coil 8, as heretofore described. It also reverses the connections of the electromagnets 61 and 62 with the lines 125 and 126. If the voltage continues to vary in the same direction between lines 103 and 104, the potential balance and the electromagnets 61 and 62 will now cause such an admission of compressed air into the cylinder 12 as will tend to move the coil 8 toward the coil 7. Since the connections of the coil 8 are reversed as the distance between the coils 7 and 8 is lessened, the coefficient of mutual induction between the coils is increased, and the voltage between the lines 101 and 102' will be consequently varied by the action of the coils 7 and 8 in the same manner as was before obtained by their separation. If the voltage between the lines 103 and 104 changes in the opposite direction from that described, a reversal of the action described will take place.

Contacts 131, 132, and 133, mounted in any suitable manner on the support 3 of the apparatus, are adapted to be connected by a switch member 134 when the coil 8 is in the extreme upper position. In order to avoid confusion in the drawings, the actual construction of the contacts and the switch, which is immaterial, has not been illustrated, except in Fig. 9. Lines 135, 136, and 137 extend from the contacts 131 132 133, respectively, to binding-posts 138, 139, and 140. A line 141 connects a binding-post 138 with one terminal of the electromagnet 97. The other terminal of the magnet 97 is connected to the contact 94. The line 142 connects the binding-post 140 with one terminal of the electromagnet 96. The other terminal of this electromagnet is connected to the contact 95. A line 143 connects the binding-post 139 with the line 123, which leads from the movable contact 93.

As before stated, when the movable coil 8 reaches its extreme upper position the contacts 131, 132, and 133 are connected by the switch member 134. If the movable coil 90 is in the position shown in Fig. 9, current will flow in series through the windings of the electromagnets 96 and 97 between the contacts 94 and 95. Assume that the connections of the various coils are as shown in Fig. 9 and that the voltage between the lines 103 and 104 continues to change, so that an engagement will take place between the contacts 93 and 95. This will have the effect of short-circuiting the coil 96, thereby allowing coil 97 to attract the armature 98, carried by the coil 90, and will hold it in a position in which engagement is made between the contacts 93 and 95 regardless of the decrease in the force tending to maintain this engagement occurring by reason of the short-circuiting of the portion 92" of the coil 92. As the inductance of the coils 96 and 97 is quite high as compared with the windings 91" and 92", the passage of current through the windings 91" and 92" upon bridging the contacts 131, 132, and 133 will be very slight. This insures a short-circuiting of the electromagnets and a proper operation of the controlling-valve, so that the switch-carrying member 28 can be operated and a reversal of the connections can be made. The coil 90 will be held in this position until the coil 8 moves out of its extreme upper position and the contacts 131, 132, and 133 are disconnected, whereupon the circuit through both the electromagnets 96 and 97 is broken. When the connections are such that it is desirable to maintain an engagement between the contacts 93 and 94 in order to operate the switch-carrying member 28, the electromagnet 97 will be short-circuited.

While, as is readily apparent, all of the parts of my apparatus coöperate advantageously to form a single regulating device, I may use some of the features hereinbefore described without employing all of them, and I do not consider that my invention is limited to the conjoint use of all the features herein shown and described or to the particular form and arrangement of the parts shown, as it is apparent that many changes may be made without departing from the spirit of my invention.

What I claim as new, and desire to secure by Letters Patent of the United States, is —

1. In a device for regulating the voltage of an electrical circuit, a fixed coil, a movable coil, one of said coils being connected in shunt to said circuit, the other of said coils being connected in series with said circuit, and automatic means for varying the inductive relation between said coils by moving the movable coil toward or away from the fixed coil.

2. In a device for regulating the voltage of an electrical circuit, a fixed coil, a movable coil, one of said coils being connected in shunt to said circuit, the other of said coils being connected in series with said circuit, and automatic means for varying the inductive relation between said coils by moving the movable coil in a straight line toward or away from the fixed coil.

3. In a voltage-regulator, a fixed coil, a movable coil, means for moving the movable coil toward and away from the fixed coil, and a switch mechanism for reversing the connections of one of the coils when the movable coil moves into a predetermined position, said mechanism comprising a switch-operating shaft, a cam carried thereby, a lock for holding the cam and thereby the shaft in one or the other of two operative positions, means operated by the movement of the movable coil for releasing said lock when the coil moves into a predetermined position, and means for causing a quick rotation of the shaft from one operative position to the other when the lock is released, comprising a spring put under tension by the movement of the coil into the predetermined position.

4. In combination, a movable member, a switch-actuating shaft, a cam carried thereby, means for locking the cam and thereby the switch in one or the other of two operative positions, means operated by the movement of the movable member into a predetermined position for releasing the cam, and means for throwing the cam and thereby the switch into the other operative position comprising a spring put under tension by the movement of the movable member into said predetermined position.

5. In a voltage-regulator, a fixed coil, a movable coil, a reversing-switch, and means for operating the reversing-switch comprising a cam provided with two engaging shoulders separated by a projection, and means carried by the movable coil for engaging one or the other of the shoulders, depending upon the position of the projection.

6. A switch and mechanism for operating it, comprising a rotatable cam provided with two working shoulders separated by a projection, and a reciprocating plunger yieldingly held in position to engage one or the other of the shoulders of the cam being yieldingly held substantially in line with the pivotal axis of the cam and adapted to be deflected therefrom by engagement with the projection between the shoulders.

7. In a device for regulating the voltage of an electric circuit, a fixed coil, a movable coil, a cylinder, a piston therein, means connecting the piston with the movable coil, a valve controlling the admission of a fluid under pressure to said cylinder to move the piston and thereby the coil in one way or the other, and automatic means controlling the action of the valve in response to changes in the voltage of the circuit to be regulated.

8. In a device for regulating the voltage of an electric circuit, a movable member, electromagnetic means controlling the movement of said movable member, and means for operating said electromagnetic means comprising a voltmeter or the like adapted to alter controlling-circuits through the electromagnetic means upon predetermined changes of voltage in the circuit to be regulated, and means controlled by the movement of the movable member into a predetermined position for maintaining the altered relation of the circuits of the electromagnetic means for an appreciable length of time.

9. In a potential-regulator, a device responsive to changes of voltage comprising a shaft having cross-arms at its ends, flexible members depending from said cross-arms, and a movable coil supported by said flexible members, said movable coil being moved in one direction by gravity and in the other direction by current responsive to the voltage to be regulated.

10. In an apparatus for regulating the voltage of an electrical circuit, a fixed coil, a movable coil, one of said coils being connected in series with said circuit and another of said coils being connected in shunt with said circuit, means for moving said coil toward or away from the fixed coil to vary the inductive relations between the coils, a switch for reversing the connections of one of said coils, and means for automatically actuating said switch upon a movement of the movable coil into a predetermined position.

11. In an apparatus for regulating the voltage of an electrical circuit, a fixed coil, a movable coil, one of said coils being connected in series with said circuit and another of said coils being connected in shunt with said circuit, means for moving said coil toward or away from the fixed coil to vary the inductive relations between the coils, a switch for reversing the connections of one of said coils, and means for automatically actuating said switch upon a movement of the movable coil into a predetermined position, said means comprising a spring put under tension by the movement of the movable coil into a predetermined position.

12. In combination, a stationary coil, a movable coil, a reversing-switch, operating means for said switch comprising a shaft, a cam connected thereto, a latch or locking device for holding said cam in one or the other of two operative positions, spring-actuated means engaging with said cam and tending to turn it from one operative position to another, said means being actuated by the movement of the movable coil, and means also moved by the movable coil for releasing the latch.

13. In combination, a fixed coil, a movable coil, means for varying the inductive relation between said coils by changing the position of the movable coil, and automatic means for reversing the connections of one of said coils on a predetermined movement of the movable coil.

14. In combination, a circuit, means for supplying alternating current to said circuit, and means for regulating the potential of said circuit comprising a winding in series with said circuit, a winding in shunt with said circuit, means for automatically varying the inductive relation between said windings, and means for reversing the connections of one of said windings with respect to the circuit.

15. In combination, a circuit supplied with alternating current, and means for regulating said circuit comprising a pair of coils, means for varying the inductive relation between said coils, and automatic means for reversing the connections of one of said coils.

16. In a regulating device, a fixed coil, a movable coil, means for moving the movable coil into and out of the position of best inductive relation with respect to the other coil, and means for reversing the connection of one of said coils when the movable coil is in the position farthest from that of the best inductive relation of the coils.

17. In combination, a pair of coils or windings, and means for varying the inductive relation between said coils or windings comprising a cylinder, a piston therefor, a valve controlling the admission of a fluid-pressure to said cylinder, a relay device for actuating said valve, and a device responsive to voltage changes for actuating said relay.

18. In a device for regulating the voltage of an electric circuit, a cylinder, a piston therefor, means for admitting fluid under pressure to said cylinder to move the piston to different positions, a coil connected to move with said piston, a fixed coil in inductive relation with the first-mentioned coil, and means responsive to changes of voltage in the circuit to be regulated for controlling the admission of fluid to said cylinder.

19. In combination, a fixed coil, a cylinder, a movable piston therefor, a movable coil directly connected to said piston and moved into positions of different inductive relation with respect to said fixed coil by the movements of said piston, and means controlling the admission of fluid under pressure to said cylinder to move said piston.

20. In a device for regulating an electric circuit, a fixed coil, a movable coil in inductive relation with the fixed coil, both of said coils being connected to said circuit, means for giving a to-and-fro movement to the movable coil to vary the inductive relation between the coils, and means for automatically reversing the connections of the movable coil when it reaches one of the limits of its to-and-fro movement.

21. In a device for regulating an electric circuit, a fixed coil, a movable coil in inductive relation to the fixed coil, both of said coils being connected to said circuit, means for moving the movable coil to vary the inductive relation between the two coils, and means for reversing the connections of one of the coils when the movable coil moves into a certain position.

22. In a device for regulating the voltage of an electric circuit, a pair of coils in inductive relation with each other connected to said circuit, and means for automatically reversing the connection of one of said coils on a predetermined change in voltage of the circuit to be regulated.

23. In a device for regulating the voltage of an electric circuit, a fixed coil, a movable coil, said coils being in inductive relation with each other and connected to said circuit, and means for moving the movable coils to vary the inductive relation between the coils, said means comprising electromagnetic operating devices, and means for simultaneously reversing the connections of one of the coils and the electromagnetic operating device upon a predetermined change in voltage in the circuit to be regulated.

24. In a device for regulating the voltage of an electric circuit, a fixed coil, a movable coil, said coils being in inductive relation with each other and connected to said circuit, and means for moving the movable coils to vary the inductive relation between the coils, said means comprising electromagnetic operating devices, and means for automatically reversing the connections of one of the coils and the electromagnetic operating device upon a predetermined change in voltage in the circuit to be regulated.

25. In a regulating device, a fixed coil, a movable coil in inductive relation to the fixed coil, means for moving the movable coil to vary the inductive relation between said coils, said means comprising a pair of electromagnets, and means for automatically reversing the connections of one of the coils upon a predetermined movement of the movable coil.

26. In combination, a voltage-changer, and controlling means therefor comprising an electric circuit, means for closing said circuit on a predetermined change in voltage, means acting to normally cause a quick break in said circuit, and means for maintaining said circuit closed for an appreciable period of time under certain conditions of the voltage-changer.

27. In a device for regulating the voltage of an electric circuit, a fixed coil, a movable coil, both of said coils being connected to said circuit, means for moving the movable coil away from the fixed coil in order to lessen the inductive action between the coils and thereby change the voltage of the circuit in one way, automatic means for altering the connections of one of the coils when the movable coil is moved into a predetermined position, and means for moving the movable coil toward the fixed coil after such alteration in connections to thereby alter the voltage of the circuit in the same way.

28. In a device for regulating the voltage of an electric circuit, two coils connected to said circuit, movable means for varying the inductive relation between said coils and thereby altering the voltage of the circuit, and automatic means for altering the connections of one of the coils upon a predetermined movement of the movable means.

29. In a potential-regulator, a voltage-changer, and controlling means therefor comprising an electric circuit, means for closing said circuit on a predetermined change in voltage, means acting normally to cause a quick break in said circuit, and means for neutralizing the action of said last-mentioned means under certain conditions.

30. In a device for regulating the voltage of an electric circuit, a pair of coils in inductive relation with each other connected to the circuit to be regulated, electromagnetically-controlled movable means for varying the inductive relation between the coils, and means for automatically altering the connections of one of said coils and the controlling means on a predetermined change of voltage in the circuit to be regulated.

31. In a device for regulating the voltage in an electric circuit, a pair of coils in inductive relation with each other connected to said circuit, movable means for varying the inductive relation between said coils to change the voltage of said circuit, and automatic means for altering the direction of voltage change made in the circuit by the coils on the movement of the movable means into a predetermined position.

32. In a device for regulating the voltage of an electric circuit, a pair of coils in inductive relation with each other and acting by reason of said relation to change the voltage of said circuit in a predetermined direction, means for varying the inductive relation between the coils to alter the voltage of the circuit, and means for automatically altering the direction of voltage change produced by the coils upon a predetermined change in voltage of the circuit.

In witness whereof I have hereunto set my hand this 22d day of September, 1903.

RICHARD FLEMING.

Witnesses:
    FREDERIC L. HORTON,
    DUGALD McK. McKILLOP.